United States Patent [19]
Stephens

[11] Patent Number: 5,803,665
[45] Date of Patent: Sep. 8, 1998

[54] METHOD AND APPARATUS FOR CONTINUOUS PRODUCTION OF QUICK-SETTING FOAMED CEMENT GROUT WITH SELECTIVELY ADJUSTABLE PROPORTIONS

[76] Inventor: Patrick J. Stephens, 1276 Chuckanut Dr., Bellingham, Wash. 98225

[21] Appl. No.: 650,890

[22] Filed: May 17, 1996

Related U.S. Application Data

[63] Continuation-in-part of Ser. No. 472,115, Jun. 7, 1995, Pat. No. 5,645,375.

[51] Int. Cl.⁶ .................................................... E21D 11/10
[52] U.S. Cl. ...................... 405/146; 405/150.1; 405/154; 405/132; 138/98
[58] Field of Search ................................. 405/146, 150.1, 405/147, 132, 141, 142; 138/97, 98

[56] References Cited

U.S. PATENT DOCUMENTS

| | | |
|---|---|---|
| 3,561,223 | 2/1971 | Tabor . |
| 4,063,425 | 12/1977 | Jutte et al. . |
| 4,419,135 | 12/1983 | Hoge . |
| 4,786,205 | 11/1988 | Yamomoto et al. . |
| 4,984,933 | 1/1991 | Annett et al. . |
| 5,063,967 | 11/1991 | Stephens . |
| 5,141,363 | 8/1992 | Stephens .............................. 405/146 X |
| 5,645,375 | 7/1997 | Stephens .................................. 405/146 |

OTHER PUBLICATIONS

Halliburton Services, Industrial Grouting Technical Data, Injector G Silicate Grouting Service.
Soast, Allen, "Mix halts flowing water in seconds," ENR Feature, Jul. 20, 1989.

*Primary Examiner*—Dennis L. Taylor
*Attorney, Agent, or Firm*—Todd N. Hathaway

[57] ABSTRACT

A method and apparatus for continuous production of a quick-setting foamed cement grout, in which the individual constituents of the grout are proportionally adjustable. Finished foam and cement slurry are mixed at metered rates to form a foamed cement grout which is pumped to a wye connection proximate a remote injection site. Sodium silicate solution is added at the wye connection at a metered rate, using a second metering pump. The sodium silicate solution mixes with the foamed cement grout to greatly accelerate the setting time thereof, and compressed air may also be added to accelerate the passage of the material through the injection hose and nozzle. The quick-setting material is particularly suited for use with a tunnel boring machine (TBM), to grout the annular cavity between the tunnel bore and the segmented liner which is installed therein.

17 Claims, 5 Drawing Sheets

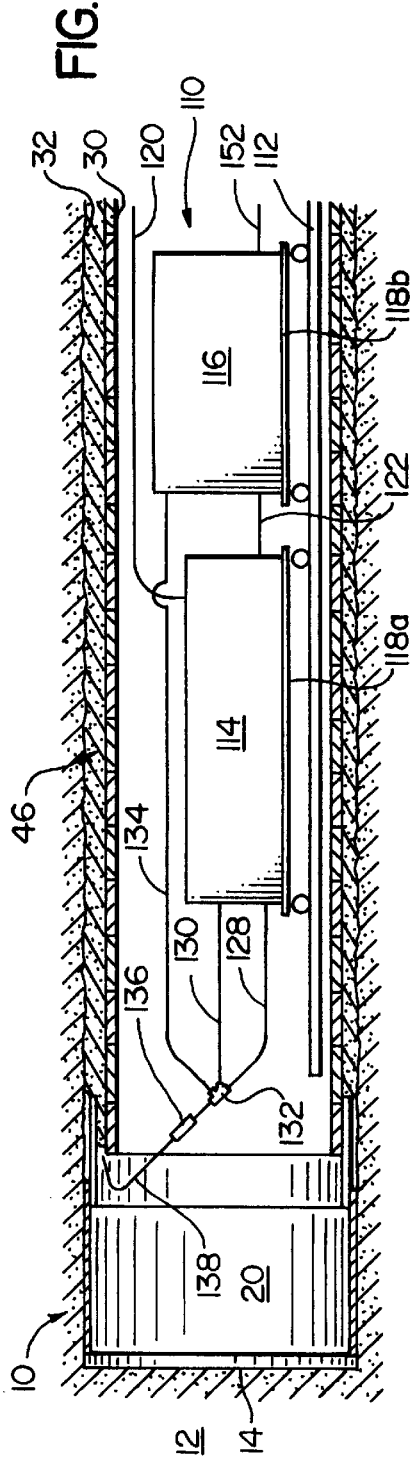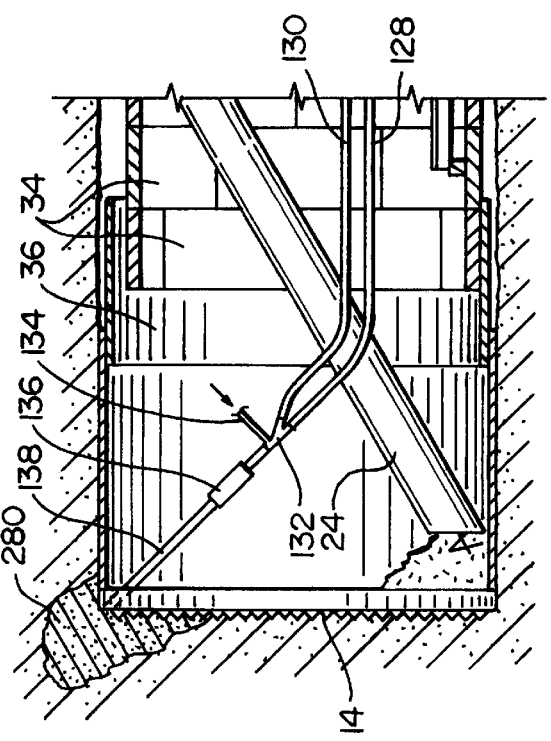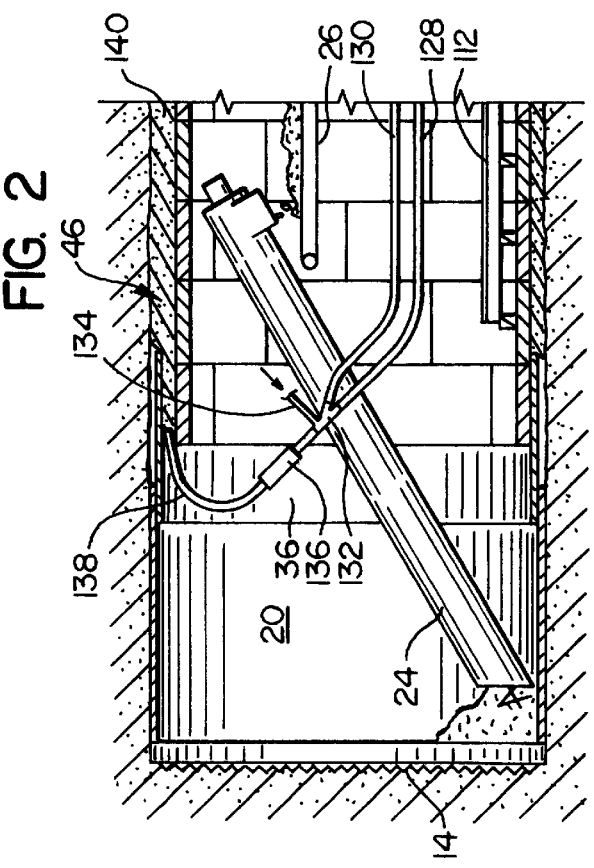

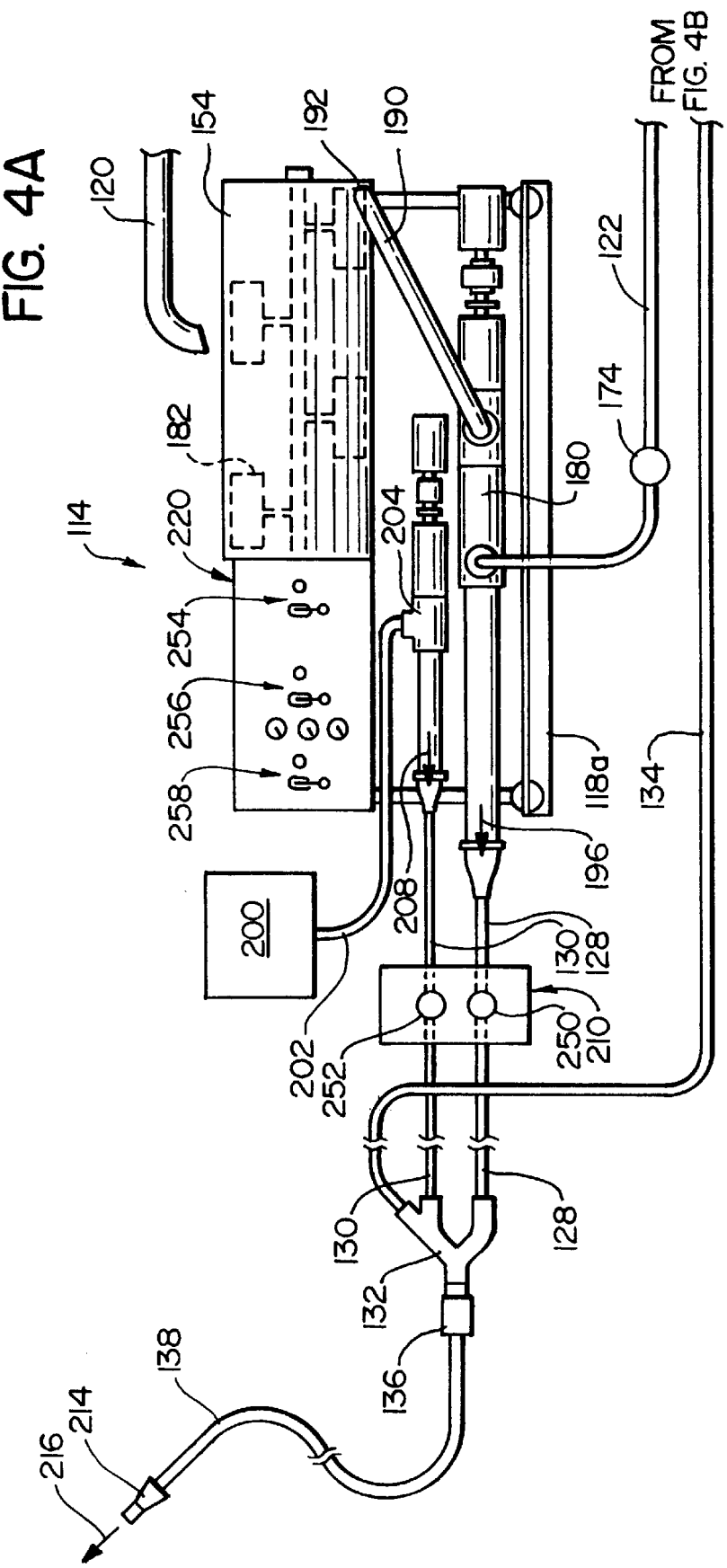

METHOD AND APPARATUS FOR CONTINUOUS PRODUCTION OF QUICK-SETTING FOAMED CEMENT GROUT WITH SELECTIVELY ADJUSTABLE PROPORTIONS

RELATED APPLICATION

This is a continuation-in-part of application Ser. No. 08/472,115 filed on Jun. 7, 1995, now U.S. Pat. No. 5,645,375.

BACKGROUND OF THE INVENTION

1. Field of the Invention

The present invention relates generally to accelerated-setting cellular cement grouts, and more particularly to a method and apparatus for continuous production of quick-setting foamed cement grout for cementitious grouting of the annular cavity between a tunnel bore and a segmented liner, and also for filling and/or stabilization of the formation through which the machine is tunneling.

2. Background

Although quick-setting grouts may have many applications in addition to the grouting of tunnel liners, the present invention is particularly suited to this use and will therefore be described herein with particular regard to the grouting of segmental tunnel liners which are installed behind a tunnel boring machine.

By way of background, in modern construction, large diameter tunnels are commonly excavated by means of tunnel boring machines. The tunnel boring machine (TBM) is not itself a part of the present invention, but its basic components and operation will be described here to give the reader a better understanding of the invention. An exemplary TBM 10 is shown in FIG. 1, as this is engaged in boring through a cutter head 14 having a series of cutter teeth on its forward face located at the forward end of the TBM. The machinery for rotating the cutter head and the associated controls (not shown) are housed within a cylindrical steel shield 20. Rubble which is removed from the rock face by the cutter head is picked up and transported by a screw lift 24 (see FIG. 2), from which the material is discharged onto a belt conveyer 26 for removal through the excavated bore.

A tunnel liner 30 is normally installed in the tunnel bore 32 behind the TBM. In most large diameter excavations the liner is of the segmental type, as is shown in FIGS. 2 and 3, wherein the liner is formed of a series of arcuate segments 34 which are assembled inside the telescoping tail shield 36 of the TBM.

The tunnel liner 30, in addition to providing a containment/support structure and preventing the collapse of material into the interior of the tunnel, provides a reaction point against which the TBM "pushes off" to effect its forward motion, using hydraulic jack mechanisms (not shown). After the machine has moved forward to a certain point, the jacks and telescoping tail shield 36 are withdrawn forwardly to permit the installation of another ring of liner segments.

Because the TBM "pushes off" from the forward ring of liner segments, it is essential that the annular gap 46 exterior to the segments be filled with a supporting material, lest the segments buckle outwardly and become displaced in response to the compressive forces which are exerted by the TBM. In the prior art this has commonly been done by filling the annular gap with gravel or other unconsolidated material which is blown into the cavity using compressed air. This approach, however, has numerous deficiencies in practice. Firstly, blowing the gravel into place is a very slow and labor-intensive operation, and the material is difficult to work with. As a result, the gravel car must remain in place for an extended period, blocking the forward end of the tracks and preventing the delivery of additional liner segments. This, in turn, delays forward progress of the TBM, adding greatly to the total cost of the operation.

Another problem with using gravel or other loose or unconsolidating material to fill the annulus is that this tends to cascade or spill down on the sides of the liner segments, leaving unfilled gaps at the crown of the liner and spilling into the interior of the TBM shield. Moreover, in order to complete the installation, it is usually necessary to follow the placement of the gravel by the injection, or "squeezing", of cement grout through ports in each of the liner segments.

Some attempts have been made to use conventional cement grouts to fill the annulus, in place of gravel. These attempts have proven wholly unsuccessful, because the fluid grout is simply too "runny" and flows down along the liner and out into the interior of the shield. Moreover, if a conventional cement grout begins to set up in the gap between the liner and the tail shield, the material will stick to the liner and shield, making it impossible to retract the latter. The gravel fill avoids this problem because of its unconsolidated nature, but at the cost of the other problems described above.

Polyurethane foam grouts are quick-setting and therefore might eliminate some of the problems noted above. However, the toxic fumes, high flammability and high exothermic temperatures which are associated with these materials render them unacceptable for use in a closed, subterranean environment.

An additional need for stable fill material develops when the TBM encounters an area of unstable earth or cavity in the course of tunneling through the subterranean formation. Most of this area is filled and/or stabilized, excessive material may collapse from this at the front of the machine or into the tunnel and bore. Heretofore, a method and apparatus for quickly filling and/or stabilizing such areas has not been available. Moreover, because the volumes of such cavities and areas of unstable earth can be quite large, it has not been possible to rapidly and efficiently fill these areas using prior art equipment and techniques.

Accordingly, there exists a need for a method and apparatus for filling the annular cavity between a tunnel liner and the tunnel bore which is expeditious and does not require excessive manpower to accomplish. Moreover, there is a need for such a method and apparatus which obviates the problem of the fill material spilling into the interior of the tunnel boring machine and leaving gaps at the crown of the liner. Still further, there is a need for such an apparatus which is capable of producing large volumes of such fill material without requiring frequent resupply by carts or other transport vehicles which would occupy the access to and from the TBM.

SUMMARY OF THE INVENTION

The present invention has solved the problems cited above, and is an apparatus for forming a substantially continuous flow of quick-setting foamed cement grout. Broadly, this comprises: (a) means for providing a substantially continuous flow of finished foam material at a metered rate, (b) pump means for mixing the flow of finished foam material with a substantially continuous flow of cement slurry which is received by the pump means at a metered rate, so as to form a flow of foamed cement grout which is discharged from the pump means, and (c) means for adding a substantially continuous flow of sodium silicate solution to the flow of foamed cement grout downstream of the pump means so as to form the quick-setting foamed cement grout, the sodium silicate solution being added at a metered rate selected to accelerate hardening of the quick-setting foamed cement grout to a predetermined initial set time.

The means for adding the flow of sodium silicate solution to the flow cement grout at a metered rate may comprise a positive displacement solution metering pump connected to a supply of the sodium silicate solution, the pump having a delivery rate which is directly proportional to an operating rate thereof, and means for selectively adjusting the operating rate of the pump so as to selectively adjust the metered rate in which the sodium silicate solution is added to the foamed cement grout and thereby adjust the initial set time of the quick-setting foamed cement grout. The solution metering pump may be a progressive-cavity, rotor-stator type pump having a variable speed drive motor.

The means for adding the flow of solution to the flow of grout may further comprise means for combining the flow of sodium silicate solution with the flow of foamed cement grout at a location proximate an injection site which is located remotely from the mixing pump, so as to minimize the time which is required to flow the quick-setting grout to the injection site after the sodium silicate solution has been added thereto. The means for combining the flow of sodium silicate solution with the flow of foamed cement grout at the location proximate the remote injection site may comprise a first conduit for conveying the foamed cement grout from the mixing pump means, a second conduit for conveying the sodium silicate from the solution metering pump, and a wye connection attached to the first and second conduits for combining the flows of solution and grout at the location proximate the remote injection site. There may also be an in-line static mixer mounted on a downstream side of they wye connection for thoroughly combining the sodium silicate solution and foamed cement grout. Furthermore, there may be means for adding a flow of compressed air to the sodium silicate solution and cement grout which are combined at the wye connection, so as to accelerate the rate of flow of the quick-setting foamed cement grout from the wye connection to the injection site.

The means for providing the flow of finished foam material at a metered rate may further comprise first control means for selectively adjusting the metered rate at which the flow of finished foam material is provided to the positive displacement mixing pump, and the mixing pump may further comprise second control means for selectively adjusting an operating rate of the variable speed drive motor thereof so as to selectively adjust the rate of flow at which the cement slurry is received thereby, so that the flows of slurry and foam material which are combined by the mixing pump can be proportionally adjusted using the first and second control means, so as to selectively adjust the density of the foamed cement grout which is produced thereby.

The present invention also provides a method for forming a substantially continuous flow of quick-setting foamed cement grout. Finally, the method comprises the steps of (a) providing a substantially continuous flow of finished foam material at a metered rate, (b) mixing the flow of finished foam material in a pump means with a substantially continuous flow of cement slurry at a metered rate so as to form a substantially continuous flow of foamed cement grout which is discharged from the pump means, and (c) adding a substantially continuous flow of sodium silicate solution to the flow of foamed cement grout downstream of the pump means so as to form the quick-setting foamed cement grout, the sodium silicate solution being added at a metered rate selected to accelerate hardening of the quick-setting foamed cement grout to a predetermined initial set time. The step of adding a flow of sodium silicate solution to the flow of cement grout at a metered rate may further comprise the step of selectively adjusting the metered rate at which the sodium silicate solution is added to the foamed cement grout, so as to thereby selectively adjust the initial set time of the quick-setting foamed cement grout. The step of adding the flow of sodium silicate solution to the flow of cement grout may further comprise combining the flow of sodium silicate solution with the flow of foamed cement grout at a location proximate an injection site which is located remotely from the mixing pump means, so as to minimize the time which is required to flow the quick-setting grout to the injection site after the sodium silicate solution has been added thereto. This may further improve the step of adding a flow of compressed air to the sodium silicate solution and cement grout which are combined at the location proximate the injection site, so as to accelerate the rate of flow of the quick-setting grout into the injection site.

BRIEF DESCRIPTION OF THE DRAWINGS

FIG. 1 is an elevational, somewhat schematic view of tunnel bore being excavated by a TBM, with the mobile apparatus for producing the rapid setting cement grout being located in the bore for supporting the excavation and liner installation operations of the TBM;

FIG. 2 is an elevational view similar to FIG. 1, showing the TBM and the forward end of the bore in enlarged detail, and the grouting of the annular cavity between the bore and the segmental tunnel liner using the apparatus of the present invention;

FIG. 3 is an elevational view similar to FIG. 2, showing the use of the apparatus of the present invention to fill a cavity or area of unconsolidated material with the rapid setting grout so as to facilitate the passage of the TBM therethrough;

DETAILED DESCRIPTION a. Overview

Figure 4B:
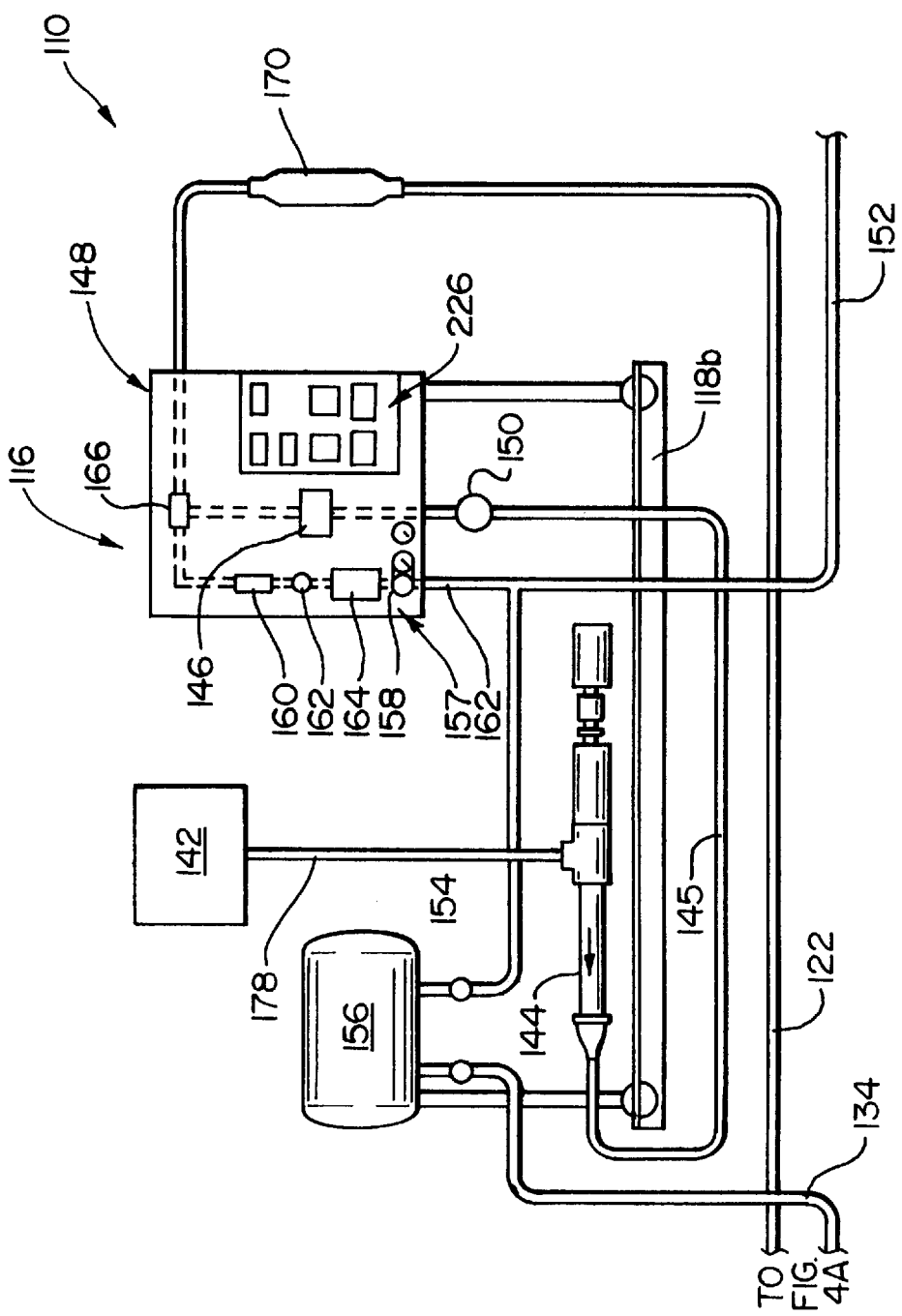
FIG. 4 is an elevational, somewhat schematic view of the apparatus of the present invention, showing the principal components thereof and the conduits for supplying materials/fluids to the apparatus and for delivering the output thereof to the installation nozzle.

As was noted above, the present invention has solved the problems of the prior art, by providing an apparatus for continuous production of a quick-setting foamed cement grout to fill the annulus between the tunnel liner and bore, and to fill all other cavities, or to stabilize areas of unconsolidated earth. Accordingly, FIG. 1 shows the apparatus 110 which generates the quick-setting foamed cement grout and injects this in accordance with the present invention. As can be seen, the apparatus 110 comprises one or more assemblies which are mounted on wheeled carts for transportation into the tunnel bore on conventional tracks 112. In the embodiment which is illustrated in FIG. 1, the apparatus comprises a mixing/pumping assembly 114 and a control/supply assembly 116, mounted on separate carts 118a, 118b for enhanced mobility, especially for use in tunnels having relatively tight turns and curves.

The cement slurry is supplied to the mixing plant pumping assembly from a remote site via conduit 120. Being that the cement slurry is comparatively fluid, it can be pumped over relatively great distances, for example, from a mixing plant located on the surface outside of the tunnel bore; alternatively, the slurry can be transported to the machine using Moran cars or similar conveyances.

As will be described in greater detail below, the cement slurry is mixed on board the mixing/pumping assembly 114 with finished foam which is supplied from the foam generator assembly 116 and supplied through conduit 122.

The mixing of the cement slurry and finished foam produces a foamed cement grout which is relatively thick in consistency and is outputted under pressure from the mixing/pumping assembly of the conduit 128. The sodium silicate solution which provides the accelerated rate of solidification of the grout is also outputted from the mixing/pumping assembly, via conduit 130. The foamed grout conduit 128 and sodium silicate conduit 130 meet at a wye connection 132 at which the two components are mixed. Pressurized air is injected via line 134 proximate the outlet end of the wye, so that the resultant mixture—cement slurry, sodium silicate and air—is forced through a downline static mixer 136. The resulting mixture, which is essentially a cellular foamed cement grout having a greatly accelerated setting rate due to the sodium silicate component, flows through a relatively short injection hose 138 and is directed into the cavity for placement.

As is shown in greater detail in FIG. 2, the material may be injected, for example, as an annular grout/backfill 140 in the gap between a tunnel and segmental liner, or (as is shown in FIG. 3) as a void fill or for stabilization of the formation through which the machine is boring. Other examples include injecting a large quantity of the quick-setting material to block or plug a passage, such as a flooded mine shaft or abandoned pipeline, so that the remainder of the passage can be filled with a cheaper, slower-setting material.

With particular regard to the grouting of segmental tunnel liners, an important advantage of the present invention is that the relatively high viscosity (as compared with ordinary cement grouts) of the foamed cement grout which is outputted by the apparatus, combined with its accelerated setting rate, obviates the problem of the material flowing downwardly along the sides of the liner and into the interior of the tunnel boring machine before it hardens. Furthermore, although the sodium silicate component causes the foamed cement grout to set up very rapidly (e.g., 3–50 seconds, although much longer set times may be desired in some applications) within the annular cavity, the cellular structure of the resulting solidified material provides it with a relatively low shear strength which allows the steel surface of the tail shield 36 to readily free itself therefrom. Thus, even after the material sets up, the tail shield easily pulls free from the solidified mass and is retracted forwardly for the next phase of excavation.

Because the quick-setting foamed cement grout is easily and quickly installed by pumping through the injection hose, the procedure is greatly expedited relative to the use of gravel or similar materials. Moreover, because all of the components (e.g., cement slurry/foam solution, sodium silicate, and air) are fluid in nature, these can be mixed and delivered to the injection site through conduits which are routed along the side or overhead of the tunnel and out of the way of the segmental liner delivery and installation trucks, so that operation of the TBM and construction of the tunnel can be conducted without significant interruption.

Having provided an overview of the present invention, several of its specific aspects and cooperating assemblies will now be described in greater detail.

b. Grout Composition

The quick setting foamed cement grout which is used in the present invention is a cementitious mixture of a Portland cement slurry, aqueous finished foam material, and water soluble sodium silicate solution or other suitable accelerator.

The aqueous finished foam material is mixed with the cement slurry in a suitable amount to provide a stable bubble structure. Suitable foam concentrate solutions, which are used to form the finished foam material, are available from the Mearl Corporation (Roselle Park, N.J.) as "MEARLCEL FOAM LIQUID", and from Elastizell Corporation (Ann Arbor, Mich.) as "ELASTIZELL EF". Mix ratios for preparing foam solution from concentrates are available from the manufacturers, with concentrations of about 2–5% by volume being generally satisfactory.

The aqueous sodium silicate solution, in turn, serves to control the accelerated rate at which the grout hardens. Suitable sodium silicate materials are available from the PQ Corporation, Valley Forge, Pa. Solution ranges are typically specified by the manufacturer; in the exemplary embodiments which are described herein, a mix ratio of one part sodium silicate to one part water, by volume, has been employed, although other proportions or even "straight" sodium silicate may be used in some applications. It should also be noted that, although aqueous sodium silicate is generally preferred due to its economy and wide availability, other suitable soluble silicate additives will occur to those skilled in the art. Also, other accelerators and gelling agents such as aluminum sulfate or magnesium sulfate or the like may be used in conjunction with or in place of the sodium silicate solutions.

By adjusting the ratio of the cement slurry to the sodium silicate, the initial set time can be adjusted over a relatively wide range; e.g., set times as fast as 3–50 seconds or as slow as 30 minutes or more. Slower setting times can be achieved by reducing the ratio of the cement to the sodium silicate, and faster times can be achieved by increasing this ratio; for example, a cement slurry to sodium silicate ratio of ½:1 has provides a relatively slower setting time, while ratios in the range of 1½–3:1 provide relatively faster set times. Suitable ratios may be found within the range from about 1:1 to 10:1 (or higher or lower than this range in some applications). For example, an eminently suitable mix is 450 gallons of cement to 80 gallons of sodium silicate, providing a ratio of about 5.6:1.

An exemplary mix design which provides satisfactory performance is set forth in the following table:

TABLE I

| | |
|---|---|
| Cement Solution | 250 lbs. Type I Portland cement |
| | 50 lbs. fly ash |
| | 21 gal. water |
| | 5% aqueous foam concentrate |
| Sodium Silicate Solution | 1 part by volume sodium silicate |
| | 1 part by volume water |
| Quick-Set Grout | 28 gal. cement slurry |
| | 9 gal. sodium silicate solution |

This example provides a cement slurry to sodium silicate solution ratio of approximately 3:1. Also, as can be seen from the table, the mix may contain materials or additives, such as fly ash, for example, in addition to the Portland cement and sodium silicate.

c. Foam Generator Assembly

The foam generator assembly 116 proportions and combines foam solution and air and passes this through a foam conditioner to produce the finished foam.

The assembly is able to supply large volumes of finished foam material on a continuous basis and with precisely controlled quality and quantity, in large part because (a) the positive displacement, progressive-cavity, rotor-stator type pumps provide a consistent flow rates which are proportionally related to their operating speeds, (b) the flow rates and hence the proportions of the components can be precisely adjusted by increasing or decreasing the speed of the pump drive motors, and (c) the drive speeds and the flow rates can be precisely monitored by the operator, and can be adjusted at will to produce the desired quality of foam and grout.

In the embodiment shown in FIG. 4, the foam solution is provided in a premixed form from a drum or tank 142; in other words, the water and foam concentrate are premixed to a desired concentration (e.g., 96:4) at a separate location before the solution is used to fill the tank. It will be understood, however, that is some embodiments the foam generating apparatus may include an additional metering pump and control circuit for mixing foam concentrate with water to form the foam solution on a continuous basis.

In the embodiment which is illustrated, the foam solution is precisely metered by controlling the operating speed of the solution metering pump 144. The solution metering pump is a positive-displacement, progressive-cavity, rotor-stator type pump, such as those which are available under the trademark "Moyno" from Robbins & Meyers, Inc., Dayton, Ohio; pumps of this type have an output rate which is directly proportional to the operating speed, so that the flow rate of the foam solution (or other constituent) can be proportionally increased or decreased simply by increasing or decreasing the drive speed of the pump. The solution is discharged from pump 144 through line 145 and passes through a flow meter 146 in control panel 148. A needle valve 150 is mounted in line 145 upstream of the flow meter to "smooth out" the slight fluctuations in flow which develop on the output side of the pump 144, so as to provide more accurate flow readings.

Compressed air is supplied to the foam generator assembly 116 via conduit 152. As can be seen in FIG. 4, a branch line 154 of the air conduit 152 supplies compressed air to a reservoir tank 156. The remainder of the air flow is supplied to the air control section 157 in the foam generator assembly. A pressure regulator 158 and ball cutout valve 160 are mounted in the air line, and a metering valve 162 adjusts the air flow, which is monitored by means of an in-line flow meter 164. The air and foam solution lines meet at a venturi mixing unit 166; the flow of air from the side of the venturi creates a vacuum effect which picks up the foam solution entering from the bottom of the unit, and mixes with this and forces the solution/air mixture out the discharge side of the unit and through foam conditioner 170.

The foam conditioner 170 may be of any suitable type. In the embodiment which is illustrated, the conditioner is preferably a tubular chamber filled with a suitable medium for conditioning the bubble structure of the foam material flowing therethrough. Suitable medium, of which many are known to those skilled in the art, include masses of beads, steel wool, washers, nuts and bolts, gravel, and so on.

The finished foam material exits foam conditioner 170 through the foam conduit 122 which is connected to the intake side of the grout metering/mixing pump 180. A check valve 174 is provided in the foam supply line so as to prevent grout from backing up through this when the foam supply is secured.

d. Cellular Grout Mixing Assembly

As was noted above, the cement slurry is supplied to the mixing/pumping assembly through conduit 120. As can be seen in FIG. 4, this discharges the slurry into the top of a mixing tub 154 in which a paddle mixer 182, operated by hydraulic motor 184 and cutout and speed controls 186, 188, agitates the slurry so as to insure a uniform consistency, and also to maintain the fluid condition of the slurry until this is mixed with the other components of the grout.

The cement slurry is fed into the intake side of pump 180, "upstream" of the foam intake, via a slurry throat 190 which is connected to a discharge port 192 on the mixing tub 154. The vertical drop between the mixing hopper and the intake provides the pump with a constant head of supply pressure. It has been found advantageous in some embodiments to route the slurry throat 190 along a somewhat circuitous path so as to help prevent the finished foam from bubbling back up through this.

The slurry metering pump 180 is another, larger capacity progressive-cavity, rotor-stator type pump, preferably operated by hydraulic motor so as to provide a wide range of available speeds (i.e., a wide RPM range). From the intake port, the slurry moves in a generally longitudinal direction through the pump 180. Downstream of the slurry intake, but still on the suction side of the pump, the finished foam is also fed into the pump cavity, through line 122. It has been found preferable to position the foam intake port some distance (e.g., 1½–3 feet) downstream of the slurry intake port, since this helps prevent the finished foam from bubbling back up through the slurry throat 192.

Downstream of the foam injection point, the cement slurry and foam are mixed proportionally within the body of the Moyno pump by the action of its rotor-stator mechanism, so as to form a well-mixed foamed cement grout. This is discharged through the output end of the pump and into grout cutout line 128, in the direction indicated by arrow 196; additional mixing and homogenization of the foamed grout takes place within the first 100 feet or so of the discharge line.

It should be noted at this point that, while the Moyno-type pump described above has been found highly advantageous for mixing and pumping the grout in the present invention, several other types of suitable pumps, such as piston pumps or squeeze pumps, may be substituted for this, with or without a supplemental mixer for the foam and slurry.

e. Sodium Silicate System

The sodium silicate solution is supplied from a tank 200, via sodium silicate feed line 202, to a third Moyno™-type metering pump 204. The sodium silicate solution is outputted under pressure from the metering pump to the sodium silicate output line 130, in the direction indicated by arrow 208.

The flexible sodium silicate and grout output lines may extend generally in parallel, as shown in FIGS. 1–4, and pass through a flow meter assembly 210 by which the rate of flow of each component is measured, and from there to the wye connection 132 where the two components flow together.

Both the foamed cement slurry and the sodium silicate solution are relatively fluid and can be pumped separately over comparatively long distances if desired, even from a remote location far down or outside of the tunnel bore in some embodiments. However, once the two components are combined at the wye connection, the mixture begins to set up at a highly accelerated rate, with solidification occurring within a few seconds to a few minutes. Accordingly, the wye connection leads to the comparatively short injection hose 138 so as to minimize flow time from this point to the injection site.

Pressurized air from the reservoir tank 156 is injected into the sodium silicate side of the wye connection 132, through air line 134. This pressurizes the flow, and increases its velocity as it passes through the static mixer 136 and injection hose 138, before being discharged into the receiving cavity through a maneuverable placement nozzle 214, in the direction indicated by arrow 216 in FIG. 4.

Because of its meringue-like consistency, the foamed cement grout can be injected into the gap between the segmental liner and tail shield of the TBM, where it tends to remain in place without running downwardly along the sides of the liner segments. Depending on the sodium silicate proportion, solidification can occur within a few seconds following injection, minimizing or eliminating any possibility of the material escaping from the annulus into the interior of the TBM. For filling large areas, such as voids along the tunnel path, the fluidity and set time can be adjusted as needed to allow the material to flow into and fill the injection site.

As a result, the present invention enables the annular gap around the tunnel liner to be filled at a greatly accelerated rate, as compared with the use of gravel. The material is easy to work with, minimizing the labor required, and also, because of the material's comparatively low shear strength (resulting from the cellular structure), the steel tail shield of the TBM easily frees itself from the solidified mass when the shield is retracted forwardly. At the same time, however, the hardened foamed cement grout exhibits relatively high compressive strength (as compared with gravel, although relatively low as compared with unfoamed cement grouts), so that this provides a very solid film material which holds the liner segments in place against longitudinal forces as the TBM "pushes off" from the leading edge of the liner.

Furthermore, the cellular structure of the foamed cement grout, i.e., the foam bubbles, produces a multiplicity of voids in the solidified mass. This greatly reduces the amount of cement which is required to fill the annulus, and thus reduces total cost. Also, because the hardened grout fills the annulus with a solid mass, as opposed to the unconsolidated gravel, the need for follow-on grouting is minimized; additional grout may be placed through injection holes in the liner segments if this is needed, but the amount of grout and time required is greatly reduced in comparison to the follow-on grouting required when using conventional gravel fill.

e. Operation

Figure 5A:
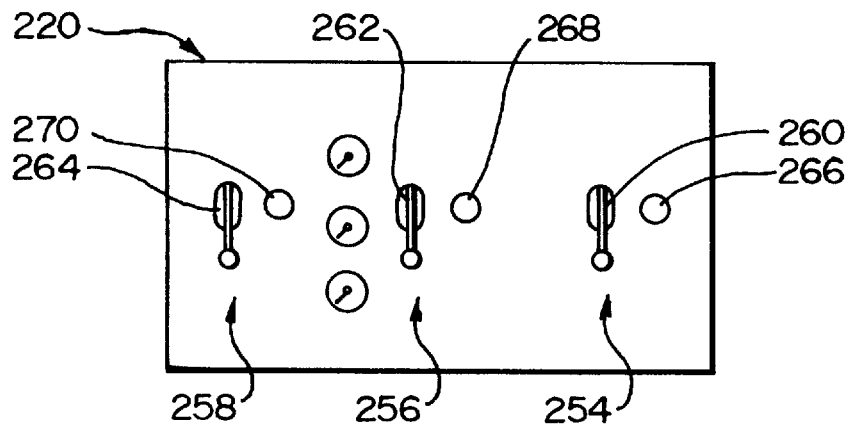
FIGS. 5A and 5B are enlarged views of the control and monitoring panels of the apparatus of FIG. 4.
Figure 5B:
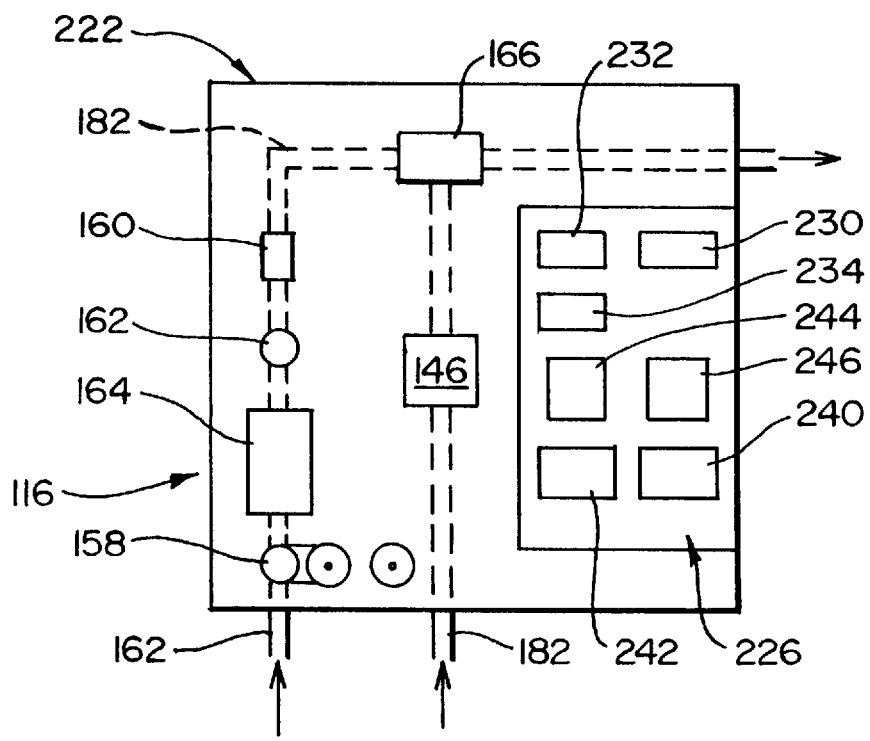

As is shown in FIGS. 5A and 5B, the principal operating controls of the apparatus 110 are grouped into two panels for convenient operation by a single crewman, namely the hydraulic control panel 220 and a flow control panel 222. The flow control panel 222 includes the foam generator section 116 and a flow monitoring section 226. The flow monitoring section 226 contains tachometer readouts (digital) 230, 232, 234 connected to tachometer drives 236 on each of the metering pumps 180, 190, 204, 144. This section also contains the readouts 240, 242, 244, 246 for the flow meters 250, 252, 164, and 146, showing the flow rates of the grout, sodium silicate solution, foam solution, and air, respectively.

Figure 6:
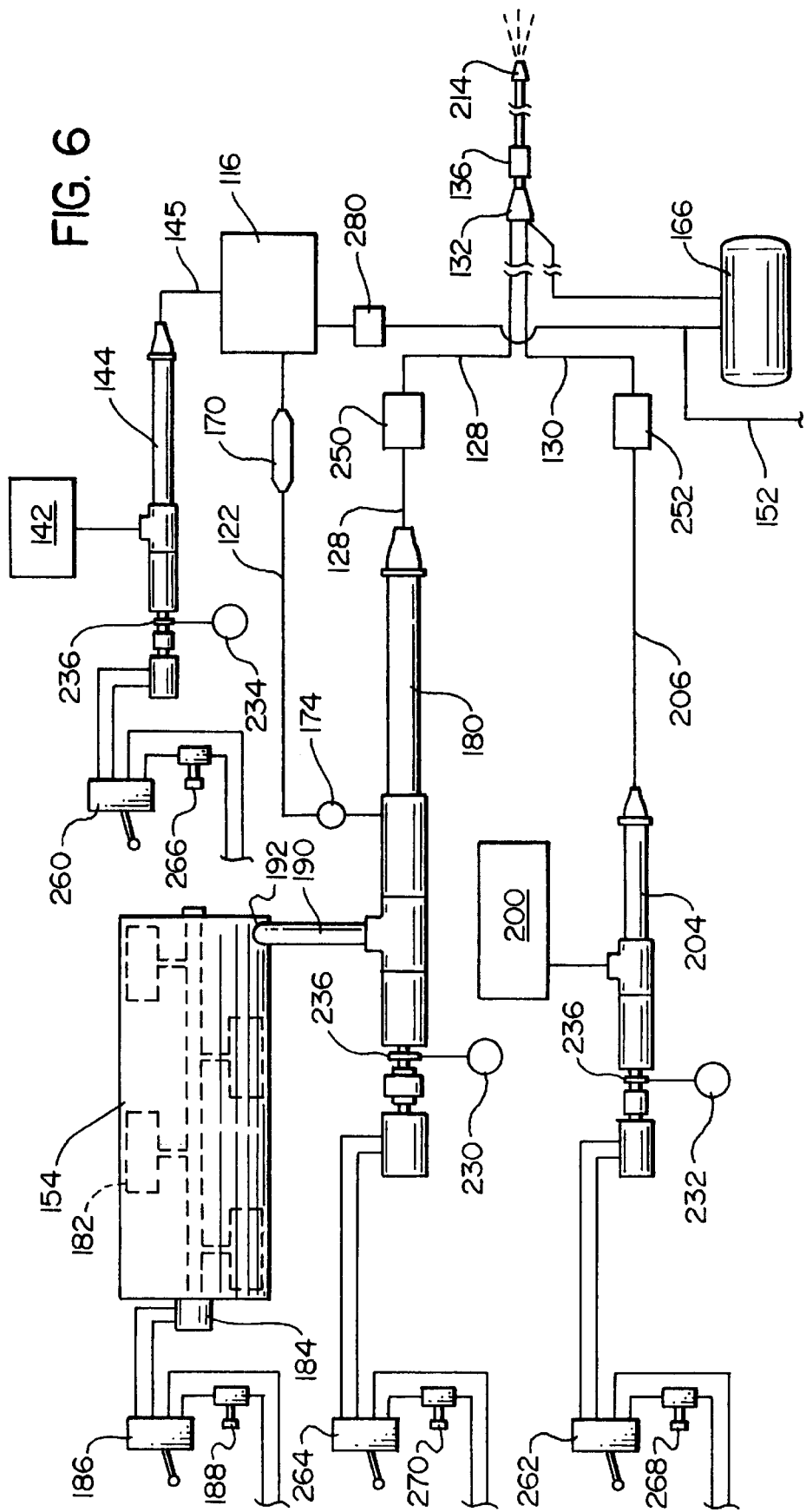
FIG. 6 is a schematic view of the apparatus of FIG. 4, illustrating the control layout thereof.

The hydraulic control panel 220, in turn, includes the three hydraulic control sections 54, 256, and 258, which regulate the operating speeds of metering pumps 180, 160, and 162. As can be seen in FIG. 6, the control circuit of each of the metering pumps is provided with an on-off valve 260, 262, 264, and a speed adjustment knob 266, 268, 270.

The information displayed on the flow control panel enables the operator to continuously monitor the system parameters and adjust the metering controls as necessary. For example, in an exemplary operational sequence, the operator initially sets the speed controls 266, 268, 270, and the air metering valve 162, based on the known pumping rates of the pumps 144, 180, and 204, to give approximately the correct proportions of cement slurry, foam solution, air, and sodium silicate solution for a predetermined mix design. The pumps are then energized and an initial sample of the foamed cement grout is obtained for weighing/analysis. Because the output rate of each of the positive displacement, progressive-cavity metering pumps is directly proportional to its operating rate, precise adjustments to the proportions can then be made using the speed controls 266, 268, 270 and the air metering valve. Once the desired ratios/characteristics have been achieved, the system is simply shut down using the cutout valves and the injection nozzle is moved into position. The machine is then restarted by simply opening the cutout valves, and the grout having the proper ratios is delivered immediately at the injection site. As the injection of the grout progresses, conditions may dictate that the consistency, density or set rate of the material be adjusted; this is accomplished by adjusting the pump speed controls to increase or decrease the amount of the particular constituent or constituents, and monitoring the changes in the flow rate or rates.

In the embodiment which is illustrated, the mixing/pumping and control/supply assemblies 114, 116 are located closely adjacent one another, with the air and cement slurry being provided from remote sources through conduits 152 and 120. This arrangement greatly facilitates the efficient operation of the equipment by a minimum number of personnel. In other embodiments, however, there may be variations on this specific configuration; for example, because the finished foam and air can be supplied over long distances, the two assemblies may be located apart from one another if desired. Also, the air may be provided by a compressor which is co-located with the assemblies. Moreover, while the cement slurry may be pumped to the apparatus through a conduit 120, such as a slick line, in some cases the slurry may be provided in batches conveyed to the apparatus through the tunnel bore by Moran cars or similar conveyances.

f. Spot-Fill/Stabilization

In addition to grouting liner segments, it is not uncommon to encounter voids/fissures or areas of relatively unstable earth as the tunneling progresses through otherwise relatively solid rock. If these areas are not stabilized prior to being excavated by the cutter head 14, the earth will tend to collapse into the path of the TBM, requiring removal of excessive material; moreover, structural problems with the formation or collapse may develop in some situations.

The present invention provides an efficient and economical solution to this problem. As can be seen in FIG. 3, when a void or area of relatively unconsolidated earth material 280 is encountered in the path of the tunnel boring machine, the injection hose 138 of the assembly 110 is directed into this area through one or more of the openings in the cutter head. The grout penetrates into the unstable area and quickly solidifies so as to provide a stable region adjacent the TBM through which the machine can then proceed without excessive material collapsing into the cutter head. Moreover, in some circumstances, stabilization of the formation can be achieved by securing the other components of the system and injecting essentially "straight" sodium silicate solution in the area.

It is therefore to be recognized that various alterations, modifications, and/or additions may be introduced into the constructions and arrangements of parts described above without departing from the spirit or ambit of the present invention as defined by the appended claims.

What is claimed is:

1. Apparatus for forming a flow of quick-setting foamed cement grout, said apparatus comprising:

means for providing a flow of finished foam material at a metered rate;

pump means for mixing said flow of finished foam material with a flow of cement slurry which is received by said pump means at a metered rate, so as to entrain air therein and thereby form a viscous, low shear-strength foamed cement grout which is discharged from said pump means, said finished foam being added to said cement slurry in an amount sufficient to provide said foamed cement grout with a viscosity which is sufficiently high to minimize flow of said grout through and out of a void prior to a predetermined initial set of time of said grout; and means for adding a flow of sodium silicate solution to said flow of foamed cement grout downstream of said pump means so as to form said quick-setting foamed cement grout, said sodium silicate solution being added at a metered rate selected to accelerate hardening of said quick-setting foamed cement grout to said predetermined initial set time.

2. The apparatus of claim 1, wherein said means for adding a flow of sodium silicate solution to said flow of cement grout at a metered rate comprises:

a positive displacement solution metering pump connected to a supply of said sodium silicate solution, said pump having a delivery rate which is directly proportional to an operating rate thereof; and means for selectively adjusting said operating rate of said pump so as to selectively adjust said metered rate at which said sodium silicate solution is added to said foamed cement grout and thereby adjust said initial set time of said quick-setting foamed cement grout.

3. The apparatus of claim 2, wherein said solution metering pump comprises:

a progressive-cavity, rotor-stator type pump having a variable speed drive motor.

4. The apparatus of claim 2, wherein said means for adding said flow of solution to said flow of grout further comprises:

means for combining said flow of sodium silicate solution with said flow of foamed cement grout at a location proximate an injection site which is located remotely from said mixing pump means, so as to minimize the time which is required to flow said quick-setting grout to said injection site after said sodium silicate solution has been added thereto.

5. The apparatus of claim 4, wherein said means for combining said flow of sodium silicate solution with said flow of foamed cement grout at a location proximate said remote injection site comprises:

a first conduit for conveying said foamed cement grout from said mixing pump means;

a second conduit for conveying said sodium silicate from said solution metering pump; and a wye connection attached to said first and second conduits for combining said flows of solution and grout at said location proximate said remote injection site.

6. The apparatus of claim 5, wherein said means for combining said flow of sodium silicate solution with said flow of foamed cement grout further comprises:

an in-line static mixer mounted on a downstream side of said wye connection for thoroughly combining said sodium silicate solution and said foamed cement grout.

7. The apparatus of claim 5, further comprising:

means for adding a flow of compressed air to said sodium silicate solution and cement grout which are combined at said wye connection, so as to accelerate the rate of flow of said quick-setting foamed cement grout from said wye connection to said injection site.

8. The apparatus of claim 5, wherein said mixing pump means comprises:

a positive-displacement mixing pump having a first intake port for receiving said flow of cement slurry and a second intake port for receiving said flow of finished foam material, so that said slurry and said foam material are mixed within a body position thereof.

9. The apparatus of claim 8, wherein said positive displacement mixing pump comprises:

a progressive-cavity, rotor-stator type pump having a delivery rate which is directly proportional to an operating rate thereof; and a variable speed drive motor.

10. The apparatus of claim 9, wherein said means for providing said flow of finished foam material at a metered rate further comprises:

first control means for selectively adjusting said metered rate at which said flow of finished foam material is provided to said second intake port of said positive-displacement mixing pump.

11. The apparatus of claim 10, wherein said mixing pump means further comprises:

second control means for selectively adjusting an operating rate of said variable speed drive motor of said rotor-stator type mixing pump so as to selectively adjust the rate of flow at which said cement slurry is received thereby;

so that said flows of cement slurry and finished foam material which are combined by said mixing pump can be proportionally adjusted using said first and second control means, so as to selectively adjust a density of said foamed cement grout which is produced by said mixing pump.

12. A method for forming a flow of quick-setting foamed cement grout, said method comprising the steps of:

providing a flow of finished foam material at a metered rate;

mixing said flow of finished foam material in a pump means with a flow of cement slurry at a metered rate so as to entrain air therein and thereby form a flow of viscous, low shear-strength foamed cement grout which is discharged from said pump means, said finished foam being added to said flow of cement slurry in an amount sufficient to provide said foamed cement grout with a viscosity which is sufficiently high to minimize flow of said grout through and out of a void prior to a predetermined initial set time of said grout; and adding a flow of sodium silicate solution to said flow of foamed cement grout downstream of said pump means so as to form said quick-setting foamed cement grout, said sodium silicate solution being added at a metered rate selected to accelerate hardening of said quick-setting foamed cement grout to said predetermined initial set time.

13. The method of claim 12, wherein the step of adding a flow of sodium silicate solution to said flow of cement grout at a metered rate further comprises the step of:

selectively adjusting said metered rate at which said sodium silicate solution is added to said foamed cement grout, so as to thereby selectively adjust said initial set time of said quick-setting foamed cement grout.

14. The method of claim 13, wherein the step of adding said flow of sodium silicate solution to said flow of cement grout further comprises:

combining said flow of sodium silicate solution flow of foamed cement grout at a location proximate an injection site which is located remotely from said mixing pump means, so as to minimize the time which is required to flow said quick setting grout to said injection site after said sodium silicate solution has been added thereto.

15. The method of claim 14, further comprising the step of:

adding a flow of compressed air to said sodium silicate solution and cement grout which are combined at said location proximate said injection site, so as to accelerate the rate of flow of said quick-setting grout into said injection site.

16. Apparatus for forming a flow of quick-setting foamed cement grout, said apparatus comprising:

foam supply means for providing a finished foam material at a metered rate of flow;

a positive displacement mixing pump connected to said foam supply means for receiving said finished foam material therefrom at said metered rate of flow, said pump having a delivery rate which is directly proportional to an operating rate thereof and an intake port for receiving a flow of cement slurry, so that by controlling said operating rate of said pump said cement slurry is drawn through said intake port at a metered rate of flow and mixed with said finished foam material in said pump so as to entrain air therein and thereby form a viscous, low shear-strength foamed cement grout which is discharged from said pump, said finished foam being added to said cement slurry in an amount sufficient to provide said grout with a viscosity which is sufficiently high to minimize flow of said grout through and out of a void prior to a predetermined initial set time of said grout; and a positive displacement solution pump connected to a supply of sodium silicate solution, said solution pump having a delivery rate which is directly proportional to an operating rate thereof and a discharge for adding said sodium silicate solution to said foamed cement grout downstream of said mixing pump so as to form said quick-setting foamed cement grout, so that by selectively controlling said operating rate of said solution pump said sodium silicate solution is added at a metered rate of flow which is selected relative to said metered rates of flow of said cement slurry and finished foam so as to accelerate hardening of said quick-setting foamed cement grout to said predetermined initial set time.

17. A method for forming a quick setting foamed cement grout said method comprising the steps of:

providing a flow of fluid cement slurry site to a positive displacement mixing pump and operating said positive displacement pump so that said cement slurry is drawn into said pump at a metered rate of flow;

supplying a finished foam material to said mixing pump at a metered rate of flow so that said finished foam material is mixed with said slurry in said pump so as to entrain air therein and thereby form a viscous, low shear-strength foamed cement grout which is discharged from said pump, said finished foam being added to said cement slurry in an amount sufficient to provide said foamed cement grout with a viscosity which is sufficiently high to minimize flow of said grout through and out of a void prior to a predetermined initial set time of said grout; and adding a sodium silicate solution to said foamed cement grout downstream of said mixing pump, said sodium silicate solution being added at a metered rate of flow which is selected relative to said metered rates of flow of said cement slurry and finished foam so as to accelerate hardening of said quick-setting foamed cement grout to said predetermined initial set time.

* * * * *